United States Patent
Rizzo et al.

(10) Patent No.: US 11,475,198 B2
(45) Date of Patent: Oct. 18, 2022

(54) METHOD AND SYSTEM FOR DESIGNING AN INTEGRATED CIRCUIT, AND AN INTEGRATED CIRCUIT

(71) Applicant: Arm Limited, Cambridge (GB)

(72) Inventors: Olivier Dominique Rizzo, Roquebrune sur Argens (FR); Grégorie Martin, Valbonne (FR); Stephane Cauneau, Gofe-Juan (FR); Yannis Jallamion-Grive, Mouans Sartoux (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/147,854

(22) Filed: Jan. 13, 2021

(65) Prior Publication Data
US 2022/0222411 A1 Jul. 14, 2022

(51) Int. Cl.
*G06F 30/392* (2020.01)
*G06F 30/331* (2020.01)
*G06F 30/347* (2020.01)
*G06F 30/398* (2020.01)

(52) U.S. Cl.
CPC .......... *G06F 30/392* (2020.01); *G06F 30/331* (2020.01); *G06F 30/347* (2020.01); *G06F 30/398* (2020.01)

(58) Field of Classification Search
CPC .... G06F 30/331; G06F 30/347; G06F 30/392; G06F 30/398
See application file for complete search history.

(56) References Cited

U.S. PATENT DOCUMENTS

| | | | |
|---|---|---|---|
| 7,073,140 B1* | 7/2006 | Li | G06F 30/367 716/115 |
| 8,612,917 B2* | 12/2013 | Chowdhury | G06F 30/3312 716/132 |
| 8,713,511 B1* | 4/2014 | Clark | G06F 30/30 716/136 |
| 10,460,066 B1* | 10/2019 | Posser | G06F 30/394 |
| 2008/0320428 A1* | 12/2008 | Lin | G06F 30/367 716/55 |
| 2014/0298281 A1* | 10/2014 | Varadarajan | G06F 30/30 716/113 |

(Continued)

*Primary Examiner* — Jack Chiang
*Assistant Examiner* — Aric Lin
(74) *Attorney, Agent, or Firm* — Quinn IP Law

(57) ABSTRACT

A computer-implemented method for designing a floorplan for an integrated circuit includes determining a circuit design for the integrated circuit, wherein the circuit design for the integrated circuit has a system device and a logic device. Logical definitions for the system device and the logic device are determined. A plurality of interconnect devices are determined. A plurality of interconnect figures of merit (FOMs) associated with the plurality of interconnect devices are also determined. The method includes determining, with an optimization operation, a candidate floorplan for the circuit design based upon the logical definitions for the system device, the logic device, the plurality of interconnect devices, and the interconnect FOMs for the interconnect devices. The candidate floorplan is determined based upon parameters associated with computational performance, power consumption, and physical area of the candidate floorplan for the circuit design. The candidate floorplan is implemented as the integrated circuit.

20 Claims, 5 Drawing Sheets

(56) References Cited

U.S. PATENT DOCUMENTS

2018/0253523 A1\* 9/2018 Pelloie .................. G06F 30/394
2020/0075478 A1\* 3/2020 Kim .................... H01L 25/0657
2021/0034512 A1\* 2/2021 Shin ...................... G06F 3/0659

\* cited by examiner

METHOD AND SYSTEM FOR DESIGNING AN INTEGRATED CIRCUIT, AND AN INTEGRATED CIRCUIT

INTRODUCTION

Integrated circuits such as cache devices, central processing units (CPU), arithmetic logic units (ALU), digital signal processors, microcomputers, field programmable gate arrays (FPGA), Systems-on-Chip (SoC), programmable logic units (PLU), microprocessors, application-specific integrated circuits (ASIC), and other devices are designed, optimized, evaluated and analyzed in context of parameters associated with performance, power consumption, and surface area. Desired parameters for such devices are those that achieve higher performance (speed), lower power consumption, and smaller surface area.

Processes for designing and fabricating an integrated circuit include identifying and developing a system specification having a technology design package, one or multiple processors (e.g., CPUs, GPUs, etc.), and one or multiple logic devices (e.g., logic elements, storage compilers, interface devices, etc.). The processors and logic devices transfer signals through routing paths that may employ vias, traces and interconnect devices. The system specification is employed to develop an architectural design, from which a functional design and a logic design for a circuit block are developed. These elements are employed to determine a layout in the form of a physical floorplan for the circuit block of the integrated circuit. Multiple iterations of a physical floorplan may be developed to achieve optimum values for performance (speed), power consumption, and surface area.

In the design of integrated circuits, automated tools may use a functional design of a circuit block to identify the logical operation(s) that the circuit block is to perform. By way of example, the functional design of the logical operation may be in the form of a gate level netlist or a Register Transfer Level (RTL) representation of the functional design, with a cell library providing a set of cells that define circuit elements in the form of system devices and logic devices. The circuit elements provide building blocks for assembling a layout of the circuit block according to the functional design.

The automated tool may take the form of a place-and-route tool that places the building blocks within the floorplan and performs a routing operation to determine routing paths to be provided within multiple metal layers in order to interconnect the building blocks such that collectively the building blocks are able to perform the logical operation of the circuit block.

When developing a floorplan, the place-and-route tool may perform a block timing analysis to ensure that the timing requirements of the circuit block are met by the routing paths. The process of developing the floorplan employing the place-and-route tool may be an iterative process, with block timing analysis being performed multiple times during the place-and-route process so that candidate floorplans and associated routing paths are subjected to timing analyses before a final decision is made to identify a final floorplan and routing path. As the complexity of the required circuit blocks increases, it is becoming difficult to accommodate the routing paths within available metal layers. In some instances, the surface area required for the circuit block may be larger than otherwise necessary to provide sufficient space for the various routing paths. Time-to-market may be increased with an increase in the quantity of iterations necessary to develop a final floorplan for the integrated circuit that achieves desired values for performance (speed), power consumption, and surface area.

Accordingly, it would be desirable to provide improved techniques for developing a floorplan that accommodate required routing paths within the layout of a circuit block that balances the need for the highest performance with conflicting demands for lowest possible power and surface area.

SUMMARY

The present disclosure relates to methods, systems, and apparatuses for designing a floorplan for an integrated circuit, including techniques for generating a layout of a circuit block for an integrated circuit that balances parameters associated with performance (speed), power consumption, and surface area that minimize signal propagation delays and maintain signal integrity in the integrated circuit.

In one embodiment, a computer-implemented method for designing a floorplan for an integrated circuit includes determining a circuit design for the integrated circuit, wherein the circuit design for the integrated circuit has a system device and a logic device. Logical definitions for the system device and the logic device are determined. A plurality of interconnect devices are determined, wherein each of the plurality of interconnect devices includes a logical definition. A plurality of interconnect figures of merit (FOMs) associated with the plurality of interconnect devices are also determined. The method includes determining, through an optimization operation, a candidate floorplan for the circuit design based upon the logical definitions for the system device, the logic device, the plurality of interconnect devices, and the interconnect FOMs for the interconnect devices. The candidate floorplan is determined based upon parameters associated with computational performance, power consumption, and physical area of the candidate floorplan for the circuit design. The candidate floorplan is implemented as the integrated circuit.

An aspect of the disclosure includes determining, through the optimization operation, the candidate floorplan for the circuit design based upon the logical definitions for the system device, the logic device, the plurality of interconnect devices, and the interconnect FOMs for the interconnect devices by selecting the plurality of interconnect devices to optimize interconnect delays between transport delay line inputs and transport delay line outputs of the logic device and the system device based upon the parameters associated with the computational performance, the power consumption, and the physical area.

Another aspect of the disclosure includes an integrated circuit in the form of a system device, a plurality of logic devices, and a plurality of interconnect devices, wherein the plurality of interconnect devices interconnects the system device and the plurality of logic devices. A circuit design is determined for the integrated circuit, wherein the circuit design for the integrated circuit includes the system device and the plurality of logic devices. The system device is defined by a logical definition for the system device and each of the plurality of logic devices is defined by a logical definition. Each of the plurality of interconnect devices is defined by a logical definition and includes an interconnect figure of merit (FOM). A candidate floorplan for the circuit design is determined through an optimization operation, wherein the optimization operation is based upon the logical definitions for the system device, the logic device, the plurality of interconnect devices, and the interconnect FOMs for the interconnect devices, wherein the candidate floorplan is determined based upon parameters associated with computational performance, power consumption, and physical area of the candidate floorplan for the circuit design. The candidate floorplan is implemented as the integrated circuit.

The summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. The following detailed description is merely exemplary in nature and is not intended to limit the application and uses. Furthermore, there is no intention to be bound by any express or implied theory presented herein.

Figure 1:
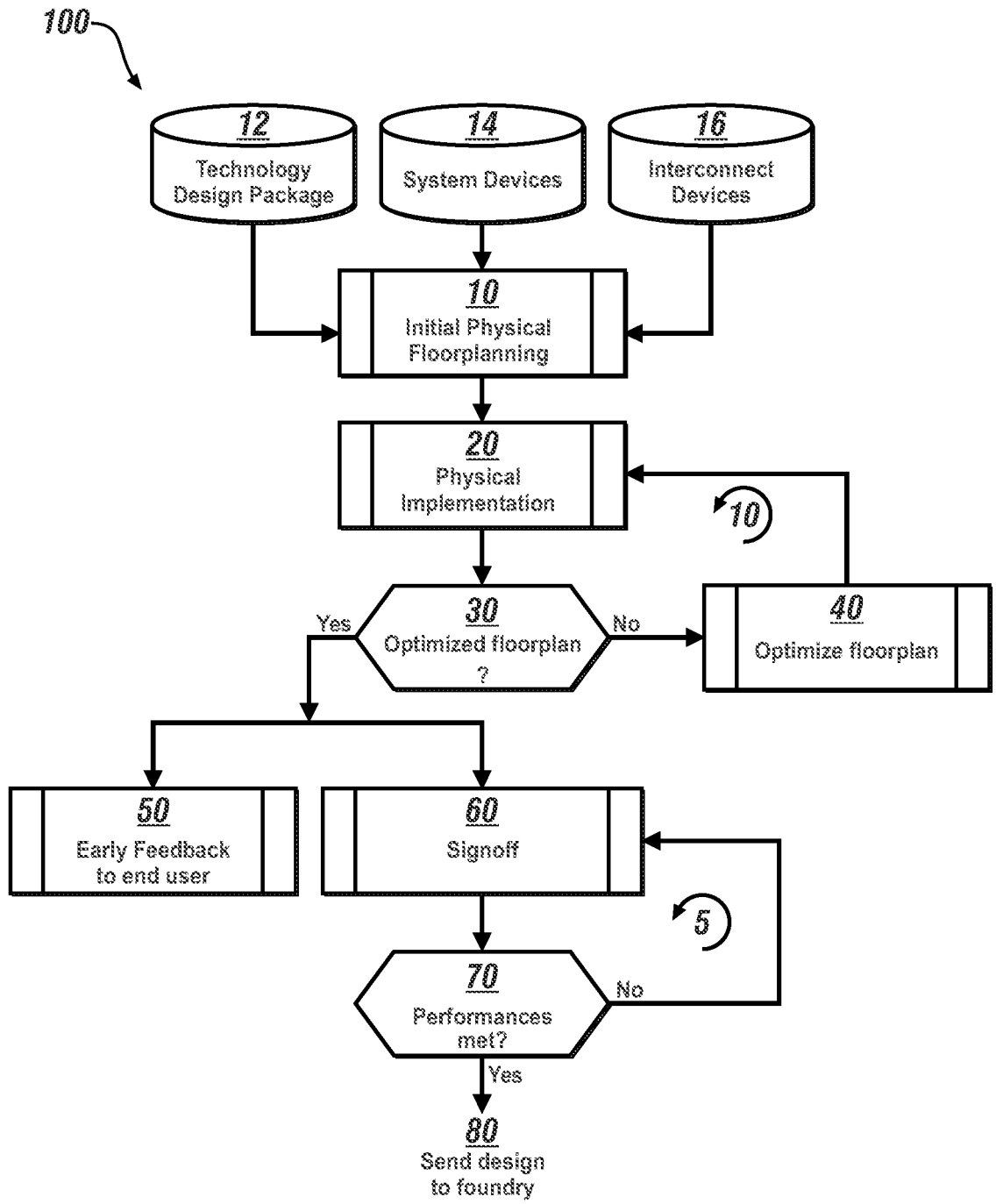
FIG. 1 schematically illustrates, in block diagram form, a known process for generating a floorplan for an integrated circuit, in accordance with the disclosure.

Referring to the drawings, wherein like reference numerals correspond to like or similar components throughout the several Figures, FIG. 1 illustrates, in block diagram form, a known process 100 for designing an integrated circuit. The process 100 includes identifying and developing a system specification having a technology design package 12, one or multiple system devices 14, and a plurality of logic devices 16. The system specification is employed to develop an architectural design, from which a functional design, a logic design, and a circuit design are developed. The technology design package 12, the system devices 14, and the logic devices 16 are employed to determine an initial physical floorplan for the integrated circuit (Step 10). The initial physical floorplan for the integrated circuit is reduced to practice as a physical implementation in the form of a physical layout of a design that includes physical placement of the system devices 14 and the plurality of logic devices 16 on a circuit, along with interconnecting wire loads, vias, traces, pillars, etc. The floorplan developed in Step 10 is employed to determine an initial physical layout for the integrated circuit (Step 20). The initial physical layout from Step 20 is subjected to testing and simulation, with metrics related to performance (processing speed), power consumption, and surface area, and with target metrics that emphasize fast performance, low power consumption, and minimum surface area. The performance, power consumption and surface area metrics for the initial physical layout from Step 20 may be evaluated in context of the target metrics related to performance, power consumption and surface area (Step 30).

When the evaluation of the initial physical layout indicates that the initial physical layout does not achieve one or more of the target metrics related to performance, power consumption and surface area (NO), adjustments are made to the physical floorplan of the technology design package to improve one or more of the performance, power consumption and surface area (Step 40). The updated floorplan developed in Step 40 is employed to determine an updated physical layout (Step 20), which is subjected to Step 30 to evaluate the performance, power consumption and surface area for the updated candidate physical layout in context of the target metrics related to performance, power consumption and surface area. This iterative process of steps 20, 30, and 40 may be repeated multiple times to achieve the target metrics related to performance, power consumption and surface area. When the evaluation of the physical layout indicates that the physical layout achieves the target metrics related to performance, power consumption and surface area, the results are supplied to an end-user, i.e., the entity that generated the technology design package 12 (step 50), and they are asked to approve the physical layout as a final physical layout (Step 60). The end-user has an option to make adjustments to the final floorplan and resubmit the adjusted final floorplan for signoff (Step 60). Flow between step 60 and the step 70 may be repeated multiple times, e.g., often up to 5 or more times. When the performance requirements are achieved (Step 70), the final physical layout is communicated to a foundry for production (Step 80).

This approach may employ Electronic Design Automation (EDA), also referred to as electronic computer-aided design (ECAD), which is a category of software tools for designing electronic systems such as integrated circuits including system-on-chip (SoC) components. EDA tools identify trade-offs between cell placement, sizing, and interconnect routing. However, there may be low predictability to this approach because such optimization relies on low performance interconnect delays, and delay and skew estimates are performed during global routing, which may not accurately reflect delays in a final design.

Furthermore, advanced technology nodes on an integrated circuit such as a memory cache device may be highly resistive, and interconnect timing performance may be highly sensitive to layer assignment, introducing a timing delay factor.

Furthermore, design sizes of integrated circuits are increasing, with timing performance targets being increasingly challenging due to increased usage of low voltage threshold logic cells and high drive strength for logic devices such as buffer and inverter cells.

Furthermore, power performance targets are increasingly challenging to achieve at maximum clocking frequencies. Some of the power consumption is the result of power consumption at interconnects. Reducing this power consumption may result in a rework of floorplan layer assignments to reduce and optimize power consumption.

Furthermore, interconnect resistance-capacitance (RC) delays are increasing due to increasing via and wire lengths and scaling of interconnect cross-sectional dimensions.

Figure 2:
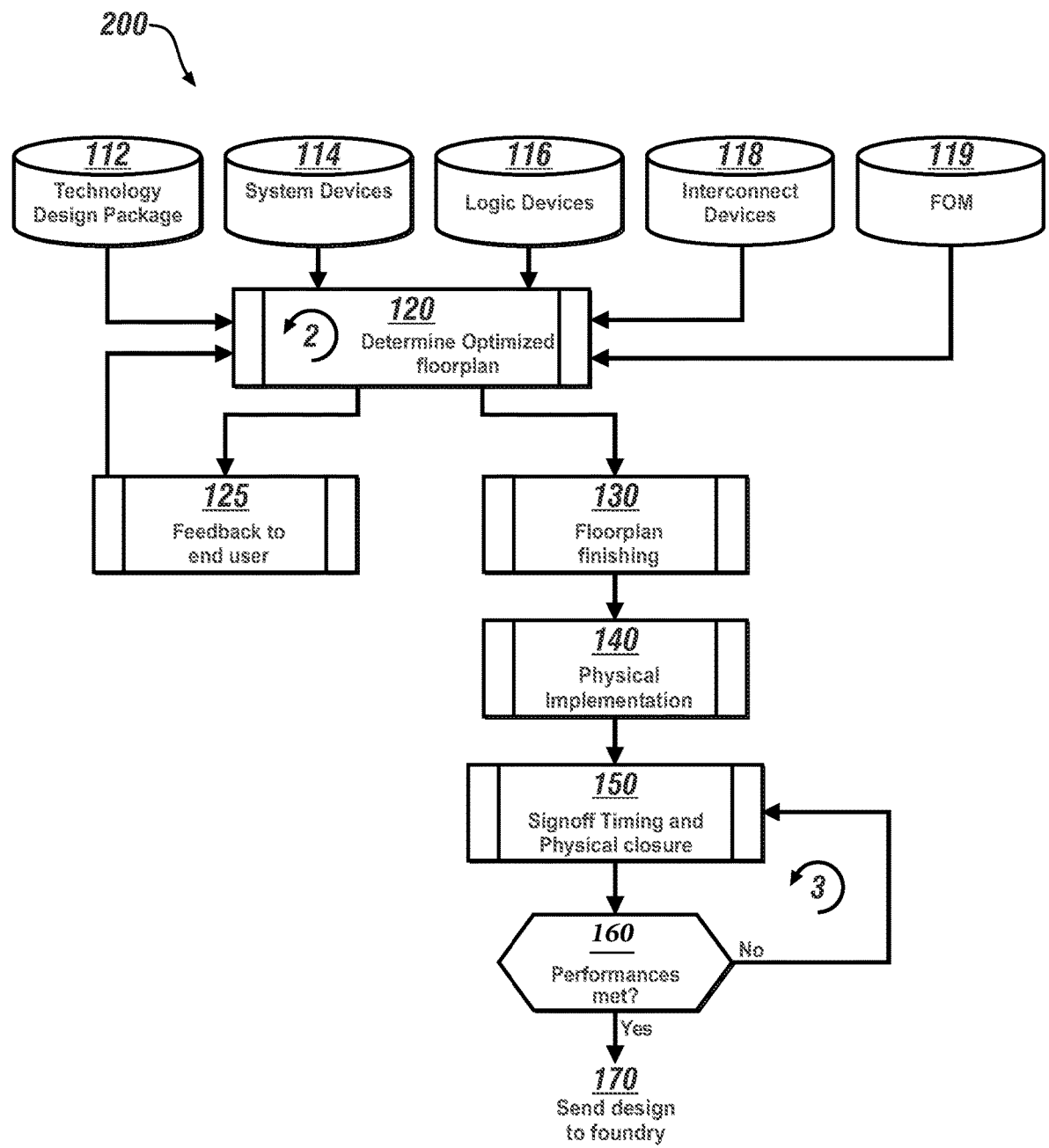
FIGS. 2 and 3 schematically illustrate, in block diagram form, a novel process for generating a floorplan for an integrated circuit, in accordance with the disclosure.
Figure 3:
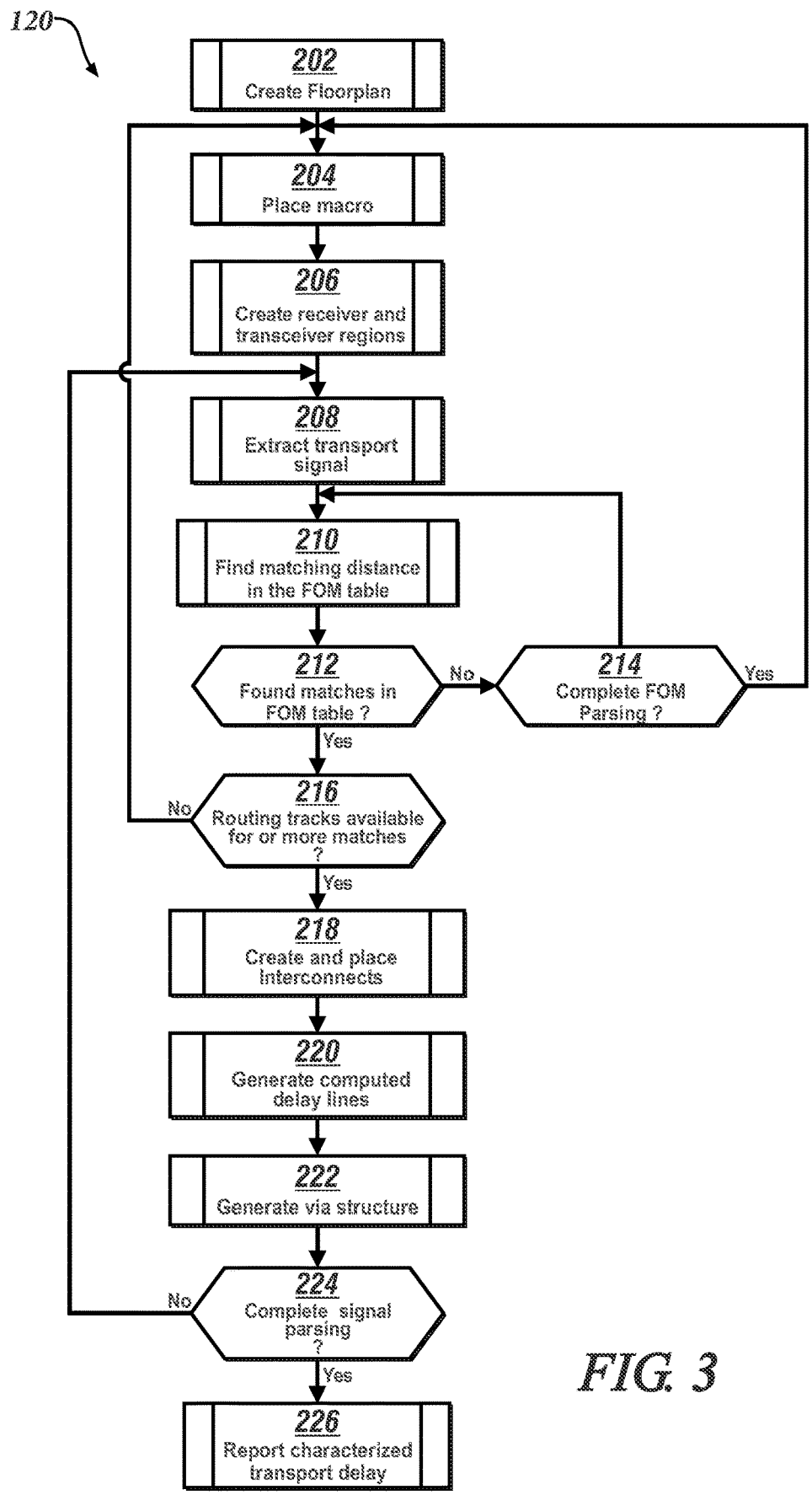
Figure 7:
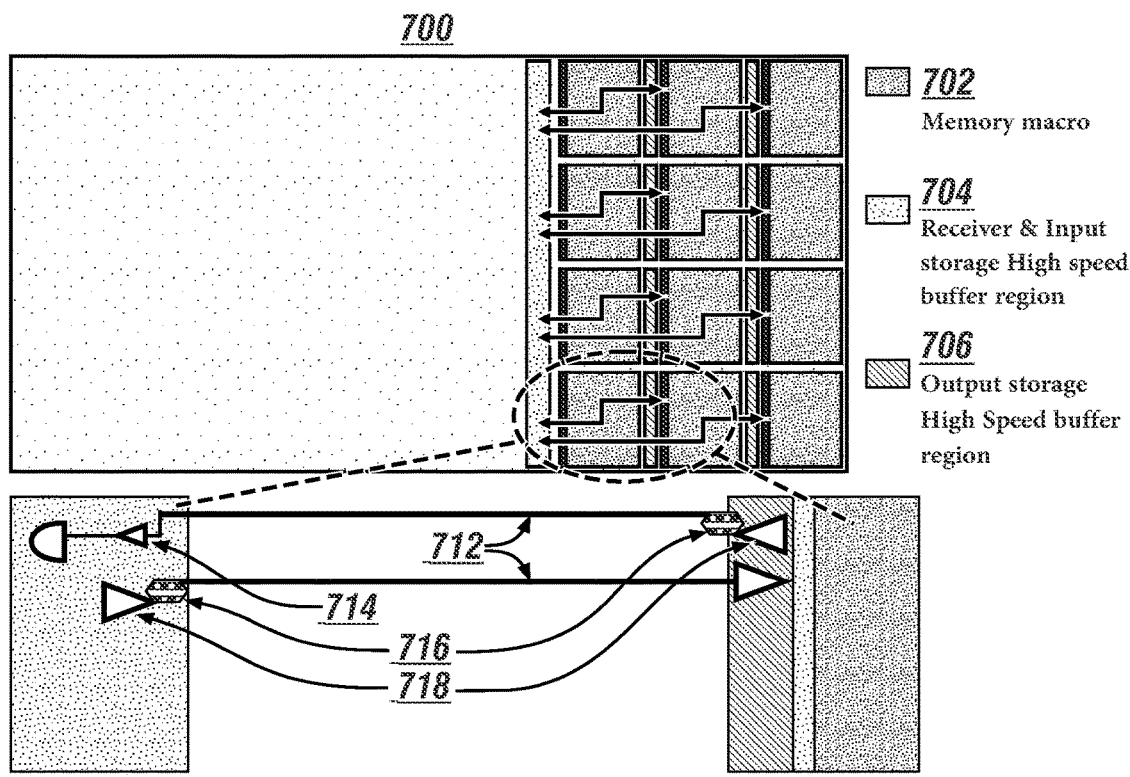
FIG. 7 schematically shows a top plan view of a portion of a candidate floorplan for an embodiment of an integrated circuit, in accordance with the disclosure.

Referring now to FIGS. 2 and 3, a process 200 is described, which may be a computer-implemented method that is advantageously employed in designing a floorplan for an integrated circuit in a manner that optimizes tradeoffs between computational performance, power consumption, and physical area while minimizing the quantity of iterations necessary to achieve an optimized floorplan design. The process 200 includes determining a circuit design for the integrated circuit, wherein the circuit design for the integrated circuit has one or multiple system devices 114, also known as system intellectual property (IP) blocks, a plurality of logic devices 116, and a plurality of candidate interconnect devices 118. A portion of an example candidate floorplan 700 is illustrated with reference to FIG. 7.

The integrated circuit may be a digital signal processor, a microcomputer, a field programmable gate array (FPGA), a System-on-Chip (SoC), a microprocessor, an application-specific integrated circuit (ASIC), etc.

The system device(s) 114 may include, by way of example, a Central Processing Unit (CPU), a Graphics Processing Unit (GPU), an arithmetic logic unit (ALU), a programmable logic unit (PLU), a storage device such as a memory cache, etc., that is configured to implement the functionality of some or all of the elements of the integrated circuit, with respective logical definitions.

The logic devices 116 may include logic library devices, storage devices, interface devices, etc., with respective logical definitions.

The candidate interconnect devices 118 are devices that interconnect between emitters (or drivers) and receivers, i.e., that interconnect between input ports and output ports of the system device(s) 114 and one of the plurality of logic devices 116. The candidate interconnect devices 118 include advanced technology nodes, vias, traces, metal layers, wire loads, pillars, signal repeaters, receivers, transceivers, pre-drivers, buffers, etc., and respective logical definitions.

Each of the system devices 114 may be represented as a functional block that performs a particular function, and may be implemented by processing circuitry, including hardware such as a logic circuit, a hardware/software combination having a processor executing software, or a combination thereof. In some example embodiments, each of the system devices 114 may be implemented by processing circuitry that may include, but is not limited to a central processing unit (CPU), a graphics processing unit (GPU), a neural network processor (NPU), a communication processor (CP), each core of a multi-core processor, a power management unit (PMU), a clock management unit (CMU), a system bus, storage device(s), a universal serial bus (USB), a peripheral component interconnect (PCI), a digital signal processor (DSP), a wired interface, a wireless interface, a controller, embedded software, a codec, a video module (e.g., a camera interface), a Joint Photographic Experts Group (JPEG) processor, a video processor, a mixer, a three-dimensional (3D) graphics core, an audio system, a driver, etc.

Logical definitions for the system devices 114, the logic devices 116, and the interconnect devices 118 are determined. In one embodiment, a rules engine employs a database of descriptive elements that can be selectively incorporated into an RTL (Register Transfer Level) description of the respective device. Interconnect figures of merit (FOMs) 119 associated with respective ones the plurality of interconnect devices 118 are also determined. An optimization operation is employed to determine a candidate floorplan for the circuit design based upon the logical definitions for the system devices 114, the logic devices 116, the plurality of interconnect devices 118, and the interconnect FOMs 119 for the interconnect devices 118, wherein the candidate floorplan is determined based upon parameters associated with computational performance, power consumption, and physical area of the candidate floorplan for the circuit design. Determining, through the optimization operation, the candidate floorplan for the circuit design based upon the logical definitions for the system device 114, the logic device 116, the plurality of interconnect devices 118, and the interconnect FOMs 119 for the interconnect devices 118 includes selecting the interconnect devices 118 to optimize interconnect delays between input ports and output ports of the logic devices 116 and the system devices 114 based upon the parameters associated with the computational performance, the power consumption, and the physical area. Determining the plurality of interconnect devices 118 to optimize interconnect delays between input ports and output ports of the logic device 116 and the system device 114 based upon the parameters associated with the computational performance, the power consumption, and the physical area includes selecting the plurality of interconnect devices 118 to achieve an optimum interconnect delay based upon a physical distance and cross-talk between the input ports and output ports of the logic device 116 and the system device 114. Performance parameters may include, by way of example, a desired operating clock frequency, gate count, target die size, maximum power dissipation, operating voltage, foundry design rules and the like. One skilled in the art will appreciate that it is also possible to specify other characteristics to granularly define system performance characteristics. For example, the designer may specify that the processor data path be either 32-bit or 64-bit wide or that the instruction length be 16-bit, 32-bit or a combination of both lengths. The designer may also specify whether multi-threading or multiple cores are required to meet the performance specification of the device. The candidate floorplan is implemented as the integrated circuit, which includes employing a foundry to fabricate the floorplan of the integrated circuit into a silicon wafer based upon the floorplan.

Referring again to FIG. 2, the process 200 for efficiently designing an integrated circuit includes identifying and developing a system specification that has a technology design package 112 that is composed of one or multiple system device(s) 114 and a plurality of logic devices 116. Other inputs to the process 200 for efficiently designing the integrated circuit include a plurality of candidate interconnect devices 118, and associated interconnect figures of merit (FOMs) 119. The system device(s) 114 and the logic devices 116 are arranged to interconnect through routing paths that may each include a single interconnect device 118 or a plurality of interconnect devices 118 arranged in series. The process 200 includes a floorplan optimization loop 120, an end-user feedback step 125, a floorplan finishing step 130, a physical implementation step 140, an approval step 150, a performance evaluation loop 160, and a foundry step 170.

The interconnect figures of merit (FOMs) 119 are related to the candidate interconnect devices 118. Each interconnect FOM is a quantity that is used to characterize the performance of a device, system or method in relation to its alternatives. The interconnect FOMs 119 are based upon interconnect delays and transport delays that are associated with interconnecting technology nodes, vias, traces in metal layers, wire loads, pillars, signal repeaters, receivers, transceivers, pre-drivers, buffers, etc. that are fabricated in routing paths. Such delays may be related to power dissipation per unit length. The interconnect FOMs 119 may be arranged as in table form to include logic descriptions of the plurality of interconnect devices 118, physical distances, and associated FOM parameters. The FOM parameters may be developed employing simulation routines based upon parameters associated with a physical distance between emitters and receivers; custom routing width and space parameters; ability to mitigate load and cross talk effects, e.g., through a pillar to reduce RC effects; emitter driver drive strength; and optimized receiver cell (drive strength and in/out load; and others.

The floorplan optimization loop 120 includes determining, through an optimization operation that is executed by an optimization tool, a candidate floorplan for the circuit design for the technology design package 112 based upon the logical definitions for the system device(s) 114, the plurality of logic devices 116, the plurality of interconnect devices 118, and the interconnect FOMs 119 for the plurality of candidate interconnect devices 118. The physical placement of the system device(s) 114 and the plurality of logic devices 116 are selected with routing paths that are configured with candidate interconnect devices 118 that are selected based upon the interconnect FOMs 119 to optimize signal delays. The candidate floorplan is determined based upon parameters associated with computational performance, power consumption, and physical area of the candidate floorplan for the circuit design for the technology design package 112. The candidate floorplan also complies with physical and electrical design rules associated with power consumption, heat transfer, signal cross-talk, part-to-part variation, etc. The floorplan optimization loop 120 may be iterated once or twice to determine the candidate floorplan.

The system specification is employed to develop an architectural design, from which a functional design, a logic design, and a circuit design are developed. The circuit design includes identifying the elements to be used and the manner in which those elements need to be interconnected in order to produce circuitry that is capable of performing the required logical operation of the circuit block FIG. 3 illustrates, in block diagram form, details related to the floorplan optimization loop 120 of the process 200 for determining the candidate floorplan for the circuit design based upon the logical definitions for the various IP devices from the technology design package 112, the system device(s) 114, the plurality of logic devices 116, the plurality of candidate interconnect devices 118, and the interconnect FOMs 119 that are associated with the plurality of candidate interconnect devices 118.

The candidate floorplan is implemented based on the candidate interconnect devices 118 and associated interconnect FOMs 119, such that the candidate interconnect devices 118 are selected to achieve optimum delays in each routing path in relation to the distance, metal layer, and cross-talk between the emitters and receivers of the respective system device(s) 114 and the plurality of logic devices 116. Physical implementation by EDA tools can be guided to focus on critical portions of the data-paths associated with the interconnect devices 118. As such, the floorplan does not depend on capabilities of an EDA tool to optimize the interconnect delays that are associated with the plurality of interconnect devices 118. Furthermore, smart skew budgeting can be based on the interconnect FOMs 119, which are pre-characterized.

Referring again to FIG. 3, the floorplan optimization loop 120 includes generating a candidate floorplan (Step 202), preferably in the form of a physical layout based upon the technology design package 112, the system device(s) 114, the plurality of logic devices 116, the plurality of candidate interconnect devices 118, and the plurality of interconnect figures of merit (FOMs) 119 that are associated with respective ones the plurality of interconnect devices 118. The example candidate floorplan 700 is illustrated with reference to FIG. 7.

The candidate floorplan for the integrated circuit is reduced to a physical implementation (Step 204) in the form of a physical layout of a design that includes a physical placement of the system device 114 and the plurality of logic devices 116 (Step 204). Placement of system devices, which are in the form of storage devices 702 in one embodiment, is illustrated with reference to FIG. 7.

Step 204 can be accomplished through a place macro. The candidate floorplan may be a two-dimensional (2D) arrangement or a three-dimensional (3D) arrangement, i.e., a multi-layer arrangement. The physical layout of the design further includes generating receiver and transceiver regions associated with the system devices 114 and the plurality of logic devices 116 (Step 206). The place macro places the system device 114 and the plurality of logic devices 116 within an overall layout, i.e., a candidate floorplan, and performs a routing operation to determine routing paths that are arranged within one or multiple metal layers in order to interconnect the system device 114 and the plurality of logic devices 116, so that collectively they are able to perform the required logical operation of the integrated circuit. The candidate floorplan is arranged and evaluated based upon parameters associated with computational performance, power consumption, and physical area of the candidate floorplan for the circuit design. Placement of the plurality of logic devices 116 in the form of receiver and input storage high speed buffer regions 706 and output storage high speed buffer regions 704 are illustrated with reference to FIG. 7.

The physical layout of the design further includes extracting a transport signal by identifying routing paths between input ports and output ports of one of the system devices 114 and one of the logic devices 116, and the corresponding signal (Step 208). The routing path between the input port and the output port of the system devices 114 and the logic devices 116 is compared with the information associated with the table containing the interconnect FOMs 119 to identify one or multiple matches between the physical distance and the associated interconnect FOMs 119 that correspond to the routing path between the input ports and output ports of the system device 114 and the logic devices 116 (Step 210).

For each routing path between an input port and a corresponding output port of the system devices 114 and the logic devices 116, the process evaluates whether one or more matches are made between the physical distances and the associated interconnect FOMs 119 (Step 212).

When no matches are found between the physical distances and the associated interconnect FOMs 119 (Step 212)(NO), the process evaluates whether the interconnect FOMs 119 have been completely parsed (Step 214), and if not (NO), repeats Steps 210 and 212.

When no matches are found between the physical distances and the associated interconnect FOMs 119 (Step 212)(NO), and all the interconnect FOMs 119 have been completely parsed without identifying an associated interconnect FOM (Step 214)(YES), the process returns to Step 204 and re-executes the place macro tool to generate an updated candidate floorplan in the form of a physical layout of a design that includes physical placement of the system devices 114 and the plurality of logic devices 116, with repeated evaluation of Steps 206, et seq.

When one or more matches are found between the physical distances and the associated interconnect FOMs 119 from Step 212 (YES), the process evaluates whether routing paths are available for the match(es) made between the physical distances and the associated interconnect FOM 119 (Step 216), and if so (YES), the process begins creating and placing the identified candidate interconnect device(s) 118 (Step 218), which includes generating computed delay line wires (Step 220), and generating via structures (Step 222) for the interconnect device 118 that is associated with the interconnect FOM. If not, the process returns from Step 216 to Step 204.

The steps of creating and placing the identified candidate interconnect device 118 (Step 218), generating computed delay line wires (Step 220), and generating via structures (Step 222) for the interconnect device 118 includes extracting RC delay lines based upon the floorplan and the macro placement from Steps 202 and 204. Transport delay and routing resources are computed, repeater lines are generated, and routing resources are assigned employing optimized high speed repeaters. Extracted repeater delay times are reported, and delay line location and placement are determined based upon the table associated with the interconnect FOMs 119. The process examines whether signals for the routing paths for the receiver and transceiver regions associated with the system devices 114 and the plurality of logic devices 116 have been parsed, and thus examined, and if not (224)(No), the process 200 returns to step 208 and the iterative loop is restarted.

This process (Steps 208-224) is repeated for each routing path that is identified and parsed between the system devices 114 and the plurality of logic devices 116, along with the plurality of candidate interconnect devices 118. This facilitates the selection of the interconnect devices 118 to optimize interconnect delays between the logic device 116 and the system device 114 based upon the parameters associated with the computational performance, the power consumption, and the physical area to achieve an optimum delay between the logic device and the system device based upon physical distance and cross-talk. Placement of examples of the interconnect devices 118 in the form of traces 712, receiver loads 714, pillars and/or vias 716, and high speed buffers 718 are illustrated with reference to FIG. 7.

When signals for the routing paths for the receiver and transceiver regions associated with the system devices 114 and the plurality of logic devices 116 have been parsed, and thus examined (Step 224)(Yes), the characterized transport delay is reported (Step 226), and the candidate floorplan that has been generated and optimized by execution of the optimization loop (Step 120) is conveyed forward.

Referring again to FIG. 2, subsequent to the execution of the optimization loop (Step 120), the following steps are executed in preparation to sending the candidate floorplan that has been generated and optimized by execution of the optimization loop (Step 120) to a foundry (Step 170) for manufacturing: feedback (Step 125), a floorplan finishing step (Step 130), a physical implementation step (Step 140), an approval step (Step 150), and a performance evaluation loop (Step 160).

Figure 4:
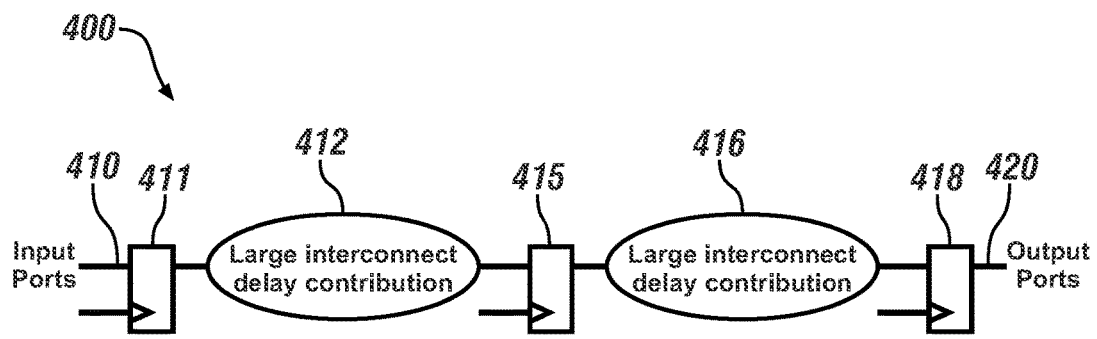
FIG. 4 schematically shows an embodiment of a physical implementation of a routing path and associated interconnect devices that is arranged between an input port and an output port for a candidate floorplan, in accordance with the disclosure.

FIG. 4 schematically shows an embodiment of a physical implementation of a first routing path 400 and associated interconnect devices that are arranged between an input port 410 and an output port 420 for a candidate floorplan. The input port 410 may be associated with one of the system devices 114 or one of the logic devices 116 that are described with reference to FIG. 2, and the output port 420 may be associated with another of the system devices 114 or one of the logic devices 116 that are described with reference to FIG. 2. The routing path 400 includes a first buffer 411, a first interconnect portion 412, a second buffer 415, and a second interconnect portion 418 that are arranged in series and span the routing path 400 between the input port 410 and the output port 420. The first and second interconnect portions 412, 416 include logic devices, traces and/or vias, and each contributes a relatively large time delay contribution and/or power dissipation contribution for a signal that is being transferred between the input port 410 and the output port 420.

Figure 5:
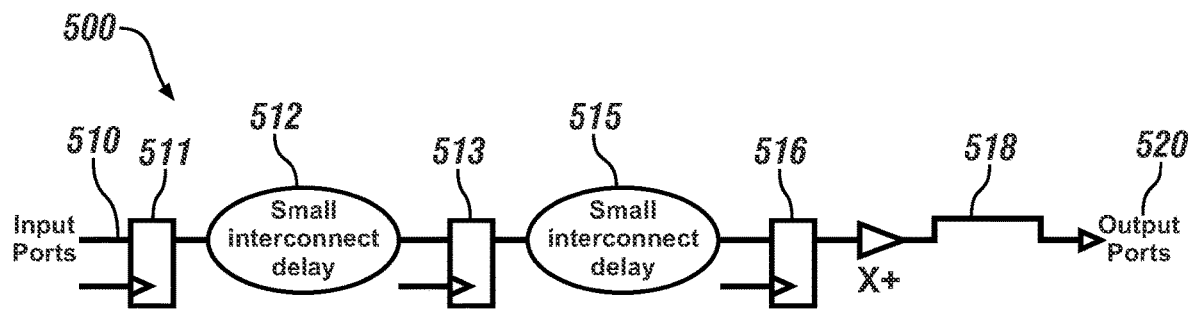
FIG. 5 schematically shows another embodiment of a physical implementation of a routing path and associated interconnect devices that is arranged between an input port and an output port for a candidate floorplan, in accordance with the disclosure.

FIG. 5 schematically shows a second embodiment of a physical implementation of a second routing path 500 and associated interconnect devices for the candidate floorplan that is arranged between an input port 510 and an output port 520, which are analogous to the input port 410 and the output port 420 that are described with reference to FIG. 4. The second routing path 500 includes a first buffer 511, a first interconnect portion 512, a second buffer 513, a second interconnect portion 515, a third buffer 516, and a high speed repeater 518 that are arranged in series and span the routing path 500 between the input port 510 and the output port 520. The first and second interconnect portions 512, 515 include logic devices and/or vias and traces. The first and second interconnect portions 512, 515 and the high speed repeater 518 each contributes a relatively small time delay contribution for a signal that is being transferred between the input port 510 and the output port 520.

Figure 6:
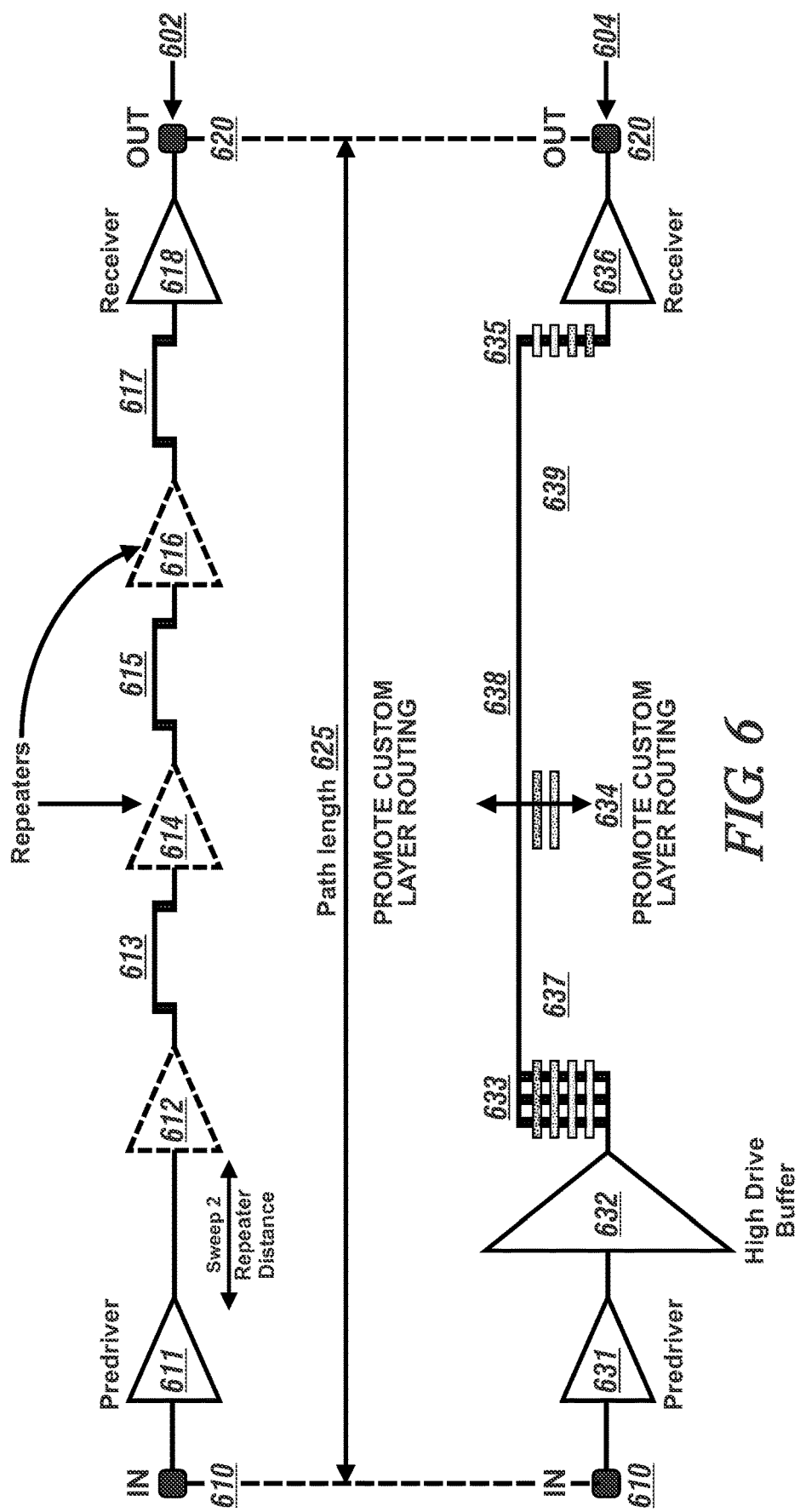
FIG. 6 schematically shows details related to embodiments of high speed repeaters that may employed as a portion of a routing path that is arranged between a transport delay line input and a transport delay line output for a candidate floorplan, in accordance with the disclosure.

FIG. 6 schematically details related to embodiments of candidate interconnect devices that form the high speed repeater 518 that is shown with reference to FIG. 5, which may be used to characterize signal delay to identify a highest achievable performance. A first candidate interconnect device 602 and a second candidate interconnect device 604 of the high speed repeater 518 shown with reference to FIG. 5 are composed from advanced technology nodes, vias, traces, metal layers, wire loads, pillars, signal repeaters, receivers, transceivers, pre-drivers, buffers, etc., that may be employed to interconnect across a path length 625 between the transport delay line input 610 and the transport delay line output 620.

The first candidate interconnect device 602 of the high speed repeater 518 shown with reference to FIG. 5 includes a pre-driver 611 that is coupled to a transport delay line input 610 and is arranged in series with a plurality of repeaters (three as shown), 612, 614, 616 with interconnecting traces 613, 615, 617, and a receiver 618 that connects to a transport delay line output 620. In the first candidate interconnect device 602, the input port 410, pre-driver 611, repeaters 612, 614, 616, and receiver 618 are all arranged on a common layer.

The second candidate interconnect device 604 of the high speed repeater 518 shown with reference to FIG. 5 includes a pre-driver 631 that is coupled to the transport delay line input 610 and coupled to a high drive buffer 632. The high drive buffer 632 couples to a receiver 636 that connects to the transport delay line output 620. The high drive buffer 632 couples to the receiver 636 by a plurality of first vertical pillars and/or vias 633 that project vertically through multiple layers 637 (5 as shown) to a communication layer 638 that includes a trace 634 that is coupled to second vertical pillar and/or vias 635, which couples to the receiver 636 that connects to the transport delay line output 620. In the second candidate interconnect device 604, the input port 410, pre-driver 631, high driver buffer 632, receiver 636 and the transport delay line output 620 are arranged on a first layer 639 of the integrated circuit, and the trace 634 is arranged on the communication layer 638 of the integrated circuit, which serves to reduces cross-talk and interference.

The first candidate interconnect device 602 and the second candidate interconnect device 604 of the high speed repeater 518 shown with reference to FIG. 5 are composed from advanced technology nodes, vias, traces, metal layers, wire loads, pillars, signal repeaters, receivers, transceivers, pre-drivers, buffers, etc., that may be employed to interconnect between the transport delay line input 610 and the transport delay line output 620. The first and second candidate interconnect devices 602, 604 of the high speed repeater 518 are evaluated based upon the parameters associated with the computational performance, the power consumption, and the physical area to achieve an optimum delay between the transport delay line input 610 and the transport delay line output 620 based upon physical distance and cross-talk. This information is employed during execution of the floorplan optimization loop 120 that is described with reference to FIGS. 2 and 3.

The concepts described herein may be advantageously employed to reduce time to market associated with designing and manufacturing a custom integrated circuit by providing an early what-if analysis for comparing design and implementation options, a predictable evaluation of performance, power consumption, and surface area, and a reduction in physical implementation runtime. This includes providing a scalable power delivery network. Reduction in the surface area may be achieved by employing abutted storage macro placement.

The concepts described herein provide opportunities to push performance by characterizing signal delays to identify highest achievable performance, and implementing FOM evaluation of the interconnect devices. The concepts facilitate optimization of clustered logic and signal transport layout, and optimization of a switched power grid to improve logic performance at a known or fixed voltage drop. The concepts also facilitate smart skew budgeting based on pre-characterized transport delay for the interconnect devices. The concepts also facilitate an optimized clock tree to reduce H-Tree clock physical implementation, and an optimized floorplan that reduces interconnect overhead, e.g., an abutted floorplan, and an interconnect delay optimization for smart cross-talk avoidance through pillar structures, etc.

The concepts further facilitate optimization of routing resources; optimization of signal and power routing resources; use of shared logic and memory power distribution through a network; a multi-cycle removal to improve performance and reduce power, including pipeline removal to lower the clock frequency and save power; a predictable timing performance; cross talk avoidance on large bus routing; a low latency clock implementation; a flexible and configurable floorplan, including pin assignment, storage macro placement, and block floorplan shaping; power savings based upon logic/repeater clustering; shared built-in test implementation and reduced test time; optimum signal transport delay based on repeater distances and routing resources; and automated skewing to share delay budget between tag and data paths.

In one or more embodiments, the method includes determining the plurality of interconnect devices by determining nodes, vias, traces, metal layers, wire loads, pillars, signal repeaters, receivers, transceivers, pre-drivers, and buffers employable to interconnect between the system device and the logic device.

In one or more embodiments, the method includes selecting the plurality of interconnect devices to optimize interconnect delays between the logic device and the system device based upon the parameters associated with the computational performance, the power consumption, and the physical area for the integrated circuit.

In one or more embodiments, the method includes selecting the plurality of interconnect devices to achieve an optimum delay between the logic device and the system device based upon metrics associated with physical distance, emitter driver strength, and receiver load.

In one or more embodiments, the method includes determining a time delay and power dissipation for each of the plurality of interconnect devices.

In one or more embodiments, the method includes determining a physical distance, a via routing width and space, a driver strength, and a receiver strength for each of the plurality of interconnect devices.

In one or more embodiments, the method includes generating a circuit layout for the integrated circuit based upon the candidate floorplan, and fabricating the integrated circuit based upon the circuit layout for the integrated circuit.

In one or more embodiments, the method includes determining a system specification for the integrated circuit, determining an architectural design based upon the system specification, determining a functional design and a logic design based upon the architectural design, and determining the circuit design based upon the functional design and the logic design.

In one or more embodiments, the method includes designing one of a microcomputer, a field programmable gate array (FPGA), a System-on-Chip (SoC), a microprocessor, or an application-specific integrated circuit (ASIC).

In one or more embodiments, the integrated circuit includes a central processing unit (CPU), a graphics processing unit (GPU), an arithmetic logic unit (ALU), and a programmable logic unit (PLU).

In one or more embodiments, the plurality of logic devices of the integrated circuit includes a simple logic library device, a memory compiler, or an interface device.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A computer-implemented method for designing an integrated circuit, the method comprising:
   determining a circuit design for the integrated circuit, wherein the circuit design for the integrated circuit includes a system device and a plurality of logic devices;
   determining a logical definition for the system device and for each of the plurality of logic devices;
   determining a plurality of interconnect devices, wherein each of the plurality of interconnect devices includes a logical definition;
   determining a plurality of interconnect figures of merit (FOMs) associated with the plurality of interconnect devices;
   determining, with an optimization operation, a candidate floorplan for the circuit design based upon the logical definitions for the system device, the plurality of logic devices, the plurality of interconnect devices, and the interconnect FOMs for the plurality of interconnect devices, wherein the candidate floorplan is determined based upon parameters associated with computational performance, power consumption, and physical area of the candidate floorplan, and wherein the optimization operation to determine the candidate floorplan includes:
      placing the system device and one of the plurality of logic devices in the candidate floorplan,
      identifying a physical distance between the system device and one of the plurality of logic devices,
      identifying a match between the physical distance and one of the plurality of interconnect FOMs,
      identifying an available routing path between the system device and the one of the plurality of logic devices that corresponds to the match, and
      further placing in the candidate floorplan along the available routing path, one of the plurality of interconnect devices associated with the one of the plurality of interconnect FOMs that is identified as the match; and
   implementing the candidate floorplan as the integrated circuit.

2. The method of claim 1, wherein determining the plurality of interconnect devices comprises determining nodes, traces, vias, metal layers, wire loads, pillars, signal repeaters, receivers, transceivers, pre-drivers, and buffers employable to interconnect between the system device and the logic device.

3. The method of claim 1, further comprising selecting the plurality of interconnect devices to optimize interconnect delays between the plurality of logic devices and the system device based upon the parameters associated with the computational performance, the power consumption, and the physical area for the integrated circuit.

4. The method of claim 3, further comprising selecting the plurality of interconnect devices to achieve an optimum delay between the plurality of logic devices and the system device based upon metrics associated with physical distance, emitter driver strength, and receiver load.

5. The method of claim 1, wherein determining the plurality of interconnect FOMs associated with the plurality of interconnect devices comprises determining a time delay and power dissipation for each of the plurality of interconnect devices.

6. The method of claim 5, wherein determining the time delay and power dissipation for each of the plurality of interconnect devices comprises determining a physical distance, a trace routing width and space, a driver strength, and a receiver strength for each of the plurality of interconnect devices.

7. The method of claim 1, wherein implementing the candidate floorplan as the integrated circuit comprises:
   generating a circuit layout for the integrated circuit based upon the candidate floorplan; and
   fabricating the integrated circuit based upon the circuit layout for the integrated circuit.

8. The method of claim 1, wherein determining the circuit design for the integrated circuit comprises:
   determining a system specification for the integrated circuit;
   determining an architectural design based upon the system specification;
   determining a functional design and a logic design based upon the architectural design; and
   determining the circuit design based upon the functional design and the logic design.

9. The method of claim 1, wherein designing the integrated circuit comprises designing one of a microcomputer, a field programmable gate array (FPGA), a System-on-Chip (SoC), a microprocessor, or an application-specific integrated circuit (ASIC).

10. A method for designing a storage device, the method comprising:
    determining a circuit design for the storage device, wherein the circuit design for the storage device includes a plurality of system devices and a plurality of logic devices;
    determining a logical definition for each of the plurality of system devices and each of the plurality of logic devices;
    determining a plurality of interconnect devices, wherein each of the plurality of interconnect devices includes one of the logical definitions;
    determining a plurality of interconnect figures of merit (FOMs) associated with the plurality of interconnect devices;
    determining, with an optimization operation, a candidate floorplan for the circuit design based upon the logical definitions for the plurality of system devices, the plurality of the logic devices, the plurality of interconnect devices, and the interconnect FOMs for the interconnect devices, wherein the candidate floorplan is determined based upon parameters associated with computational performance, power consumption, and physical area of the candidate floorplan for the circuit design, and wherein the optimization operation to determine the candidate floorplan includes:
       placing the system device and one of the plurality of logic devices in the candidate floorplan,
       identifying a physical distance between the system device and one of the plurality of logic devices,
       identifying a match between the physical distance and one of the plurality of interconnect FOMs,
       identifying an available routing path between the system device and the one of the plurality of logic devices that corresponds to the match, and further placing in the candidate floorplan along the available routing path, one of the plurality of interconnect devices associated with the one of the plurality of interconnect FOMs that is identified as the match; and and implementing the candidate floorplan as the storage device.

11. The method of claim 10, wherein determining, with the optimization operation, the candidate floorplan for the circuit design based upon the logical definitions for the system device, the logic device, the plurality of interconnect devices, and the interconnect FOMs for the interconnect devices comprises selecting the plurality of interconnect devices to optimize interconnect delays between transport delay line inputs and transport delay line outputs of the plurality of logic devices and the plurality of system devices based upon the parameters associated with the computational performance, the power consumption, and the physical area.

12. The method of claim 11, wherein determining the plurality of interconnect devices to optimize interconnect delays between the transport delay lines and the transport delay line output of the plurality of logic devices and the plurality of system devices based upon the parameters associated with the computational performance, the power consumption, and the physical area comprises selecting the plurality of interconnect devices to achieve an optimum delay based upon a plurality of physical distances and cross-talk between the transport delay line inputs and the transport delay line outputs of the plurality of logic devices and the plurality of system devices.

13. The method of claim 10, determining the plurality of interconnect devices comprises determining nodes, traces, vias, metal layers, wire loads, pillars, signal repeaters, receivers, transceivers, pre-drivers, and buffers employable to interconnect between emitters and receivers of the plurality of system devices and the plurality of logic devices.

14. The method of claim 10, wherein implementing the candidate floorplan as the storage device comprises:

generating a circuit layout of the storage device based upon the candidate floorplan; and fabricating the storage device based upon the circuit layout for the storage device.

15. The method of claim 10, wherein determining the circuit design for the storage device comprises:

determining a system specification for the storage device;

determining an architectural design based upon the system specification;

determining a functional design and a logic design based upon the architectural design; and determining the circuit design based upon the functional design and the logic design.

16. The method of claim 10, wherein determining the plurality of interconnect FOMs associated with the plurality of interconnect devices comprises determining a time delay and power dissipation for each of the plurality of interconnect devices.

17. The method of claim 16, wherein determining the time delay and power dissipation for each of the plurality of interconnect devices comprises determining a physical distance, a via routing width and space, a driver strength, and a receiver strength for each of the plurality of interconnect devices.

18. An integrated circuit, comprising:

a system device, a plurality of logic devices, and a plurality of interconnect devices;

wherein the plurality of interconnect devices interconnects the system device and the plurality of logic devices;

wherein a circuit design is determined for the integrated circuit, wherein the circuit design for the integrated circuit includes the system device and the plurality of logic devices;

wherein the system device and each of the plurality of logic devices is defined by a logical definition;

wherein each of the plurality of interconnect devices is defined by one of the logical definitions;

wherein each of plurality of the interconnect devices defines an interconnect figure of merit (FOM);

wherein a candidate floorplan for the circuit design is determined through an optimization operation, wherein the optimization operation is based upon the logical definitions for the system device, the plurality of logic devices, the plurality of interconnect devices, and the interconnect FOMs for the interconnect devices, wherein the candidate floorplan is determined based upon parameters associated with computational performance, power consumption, and physical area of the candidate floorplan for the circuit design, and wherein the optimization operation to determine the candidate floorplan includes steps to:

place the system device and one of the plurality of logic devices in the candidate floorplan, identify a physical distance between the system device and one of the plurality of logic devices, identify a match between the physical distance and one of the plurality of interconnect FOMs, identify an available routing path between the system device and the one of the plurality of logic devices that corresponds to the match, and further place in the candidate floorplan along the available routing path, one of the plurality of interconnect devices associated with the one of the plurality of interconnect FOMs that is identified as the match; and wherein the candidate floorplan is implemented as the integrated circuit.

19. The integrated circuit of claim 18, wherein the system device comprises at least one of a central processing unit (CPU), a graphics processing unit (GPU), an arithmetic logic unit (ALU), and a programmable logic unit (PLU).

20. The integrated circuit of claim 18, wherein the plurality of logic devices comprises at least one of a simple logic library device, a storage device, or an interface device.

* * * * *